US008105672B2

(12) United States Patent
Nakamura et al.

(10) Patent No.: US 8,105,672 B2

(45) Date of Patent: Jan. 31, 2012

(54) ELECTROCONDUCTIVE MEMBER, PROCESS CARTRIDGE, AND IMAGE FORMING APPARATUS

(75) Inventors: Makoto Nakamura, Ebina (JP); Toshio Kojima, Isehara (JP); Yutaka Narita, Sagamihara (JP); Tadaaki Hattori, Hadano (JP); Taisuke Tokuwaki, Sagamihara (JP); Tadayuki Oshima, Atsugi (JP); Hiroki Furubayashi, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 662 days.

(21) Appl. No.: 11/837,751

(22) Filed: Aug. 13, 2007

(65) Prior Publication Data

US 2008/0044751 A1 Feb. 21, 2008

(30) Foreign Application Priority Data

Aug. 14, 2006 (JP) ................................ 2006-221035

(51) Int. Cl.

| | |
|---|---|
| ***B32B 1/08*** | (2006.01) |
| ***G03G 15/04*** | (2006.01) |
| ***G03G 15/00*** | (2006.01) |
| ***G03G 15/02*** | (2006.01) |

(52) U.S. Cl. .................... 428/36.91; 428/36.9; 399/159; 399/168; 430/69

(58) Field of Classification Search ................. 428/36.9, 428/36.91; 399/159, 168; 430/69

See application file for complete search history.

(56) References Cited

U.S. PATENT DOCUMENTS

| | | | | |
|---|---|---|---|---|
| 5,475,473 | A * | 12/1995 | Masuda et al. | 399/168 |
| 5,821,022 | A * | 10/1998 | Ohishi et al. | 430/111.35 |
| 6,302,835 | B1 * | 10/2001 | Davis et al. | 492/59 |
| 7,151,904 | B2 | 12/2006 | Narita et al. | |
| 2006/0024606 | A1 * | 2/2006 | Suzuki et al. | 430/111.35 |
| 2006/0188293 | A1 | 8/2006 | Narita et al. | |
| 2006/0270541 | A1 | 11/2006 | Narita et al. | |
| 2007/0166076 | A1 | 7/2007 | Oshima et al. | |

FOREIGN PATENT DOCUMENTS

| | | |
|---|---|---|
| JP | 3-240076 | 10/1991 |
| JP | 2001-312121 | 11/2001 |
| JP | 2002-132014 | * 5/2002 |
| JP | 2003-107821 | 4/2003 |
| JP | 2004-4146 | 1/2004 |
| JP | 2005084132 | 3/2005 |
| JP | 2005-91818 | 4/2005 |
| JP | 2006-251008 | 9/2006 |
| JP | 2006251008 | 9/2006 |
| JP | 2007-108468 | 4/2007 |

OTHER PUBLICATIONS

Machine Translation of JP 2002-132014 May 2002.*

U.S. Appl. No. 11/854,947, filed Sep. 13, 2007, Oshima, et al.

U.S. Appl. No. 11/836,950, filed Aug. 10, 2007, Tokuwaki, et al.

U.S. Appl. No. 12/044,521, filed Mar. 7, 2008, Oshima, et al.

* cited by examiner

*Primary Examiner* — Rena Dye

*Assistant Examiner* — Erik Kashnikow

(74) *Attorney, Agent, or Firm* — Oblon, Spivak, McClelland, Maier & Neustadt, L.L.P.

(57) ABSTRACT

An electroconductive member including an electroconductive support, an electric resistance adjusting layer formed on the electroconductive support, and a top surface layer that coats the surface of the electric resistance adjusting layer, the top surface layer containing at least one oxygen-containing inorganic compound selected from among a composite oxide of silicon and aluminum, an oxygen-containing silicon compound, and an oxygen-containing aluminum compound.

19 Claims, 4 Drawing Sheets

ELECTROCONDUCTIVE MEMBER, PROCESS CARTRIDGE, AND IMAGE FORMING APPARATUS

PRIORITY CLAIM

The present application is based on and claims from Japanese Application Number 2006-221035, filed on Aug. 14, 2006, the disclosure of which is incorporated by reference herein in its entirety.

BACKGROUND OF THE INVENTION

1. Field of the Invention

The present invention relates to an electroconductive member adaptable to a charging member, a developer carrier, a transfer member, or the like disposed adjacent to an image carrier in an electrophotographic image forming apparatus such as a copying machine, a laser beam printer, or a facsimile, a process cartridge including the electroconductive member, and an image forming apparatus including the process cartridge.

2. Description of Related Art

An electrophotographic image forming apparatus such as a copying machine, a laser beam printer, or a facsimile has been conventionally provided with a charging member that performs an electrification process on an image carrier (or an electrostatic latent image carrier or a photoconductor), and a transfer member that performs a transfer process on toner on the photoconductor. An electroconductive member is used as the charging member or the transfer member. A case using the electroconductive member as the charging member is mentioned hereinafter.

FIG. 1 is a schematic illustration of an electrophotographic image forming apparatus. In FIG. 1, reference numeral 11 denotes an image carrier or a photoconductor on which an electrostatic latent image is formed; 12, a charging member or a charger roller that performs an electrification process, disposed in contact with or in proximity to the image carrier 11; 13, light for exposure, such as laser light or reflected light from an original; 14, a toner carrier or a developing roller that causes toner 15 to adhere to the electrostatic latent image on the image carrier 11; 16, a transfer member (or a transfer roller) that transfers a toner image on the image carrier 11 to a recording medium 17; and 18, a cleaning member or a blade for cleaning the image carrier 11 after the transfer process.

Reference numeral 19 denotes waste toner discharged by the cleaning member 18 removing the toner remaining on the image carrier 11; 201, a developing unit; and 211, a cleaning unit.

Incidentally, functional units generally required for other electrophotography processes are omitted from FIG. 1, because they are not necessary for explanation.

The image forming apparatus as mentioned above is configured to form an image through the following processes.

1. The charger roller 12 electrifies the surface of the image carrier 11 at a desired potential.

2. An exposure unit projects image light onto the image carrier 11 to form on the image carrier 11 an electrostatic latent image corresponding to a desired image.

3. The developing roller develops the electrostatic latent image by the toner to form a toner image or a developed image on the image carrier 11.

4. The transfer roller 16 transfers the toner image on the image carrier 11 to the recording paper 17.

5. The cleaning unit 18 cleans off the toner remaining on the image carrier 11 without being transferred.

6. The transfer roller 16 carries to a fixing unit (not shown) the recording paper 17 having the toner image transferred thereto. The fixing unit applies heat and pressure to the toner to fix the toner onto the recording paper 17.

The above procedure 1 to 6 is repeated to form a desired image on the recording paper 17.

Conventional electrification methods using the charger roller include a contact electrification method that involves bringing the charger roller into contact with the image carrier. The conventional contact electrification method has the following problems (1) to (5).

(1) The charger roller leaves its track on the surface of the image carrier since a constituent substance of the charger roller seeps out of the charger roller onto the surface of the charged image carrier.

(2) Static crackling is emitted since the charger roller in contact with the charged image carrier vibrates when subjected to an alternating voltage.

(3) The charger roller undergoes deterioration in electrification performance since the toner on the image carrier adheres to the charger roller (or, in particular, the above-mentioned seepage increases the likelihood of adhesion of the toner).

(4) The constituent substance of the charger roller adheres to the image carrier.

(5) The charger roller undergoes permanent deformation when the image carrier is not in use for a long time.

As a method for solving the above problems, there is proposed a proximity electrification method that involves bringing the charger roller into proximity with the image carrier, as disclosed in JPA No. 3-240076 (Patent Document 1), JPA No. 2001-312121 (Patent Document 2), JPA No. 2005-91818 (Patent Document 3), and so on. The method electrifies the image carrier by applying a voltage to the charger roller disposed as facing the image carrier with a distance or a gap of 50 to 300 μm between when the charger roller and the image carrier are in closest proximity to each other. Because of providing no contact between a charger unit and the image carrier, the proximity electrification method does not present the problems inherent in a contact charger unit, that is, "the adhesion of the constituent substance of the charger roller to the image carrier" and "the permanent deformation caused by the image carrier being in its stopped state for a long time." As for "the deterioration in the electrification performance due to the adhesion of the toner or the like on the image carrier to the charger roller," the proximity electrification method is superior in electrification performance because of reducing the toner adhering to the charger roller.

At this point, a non-contact electrification method is more excellent than the contact electrification method. Because of using corona discharge following Paschen's law between the charger roller and the image carrier to electrify the surface of the photoconductor, however, both the methods produce or generate oxidative gases such as ozone or $NO_x$, thus leading to deterioration in the surfaces of the image carrier and the charger roller with time. The deterioration increases the likelihood of adhesion of the toner and its constituent substance to the surface of the charger roller, thus leading to the deterioration in the electrification performance of the charger roller. The deterioration results in deterioration of the electrification performance of the image carrier, or the like, thereby increasing the likelihood of image degradation.

SUMMARY OF THE INVENTION

An object of the present invention is to provide an electroconductive member that maintains stable electrification performance and thus eliminates the occurrence of image degradation, even if it is used as a charging member over the long term.

To accomplish the above object, an electroconductive member according to one embodiment of the present invention includes an electroconductive support, an electric resistance adjusting layer formed on the electroconductive support, and a top surface layer that coats the surface of the electric resistance adjusting layer.

The top surface layer contains at least one oxygen-containing inorganic compound selected from among a composite oxide of silicon and aluminum, an oxygen-containing silicon compound, and an oxygen-containing aluminum compound.

DETAILED DESCRIPTION OF THE PREFERRED EMBODIMENTS

Preferred embodiments of the present invention will be described below with reference to the accompanying drawings.

(Image Forming Apparatus)

Figure 1:
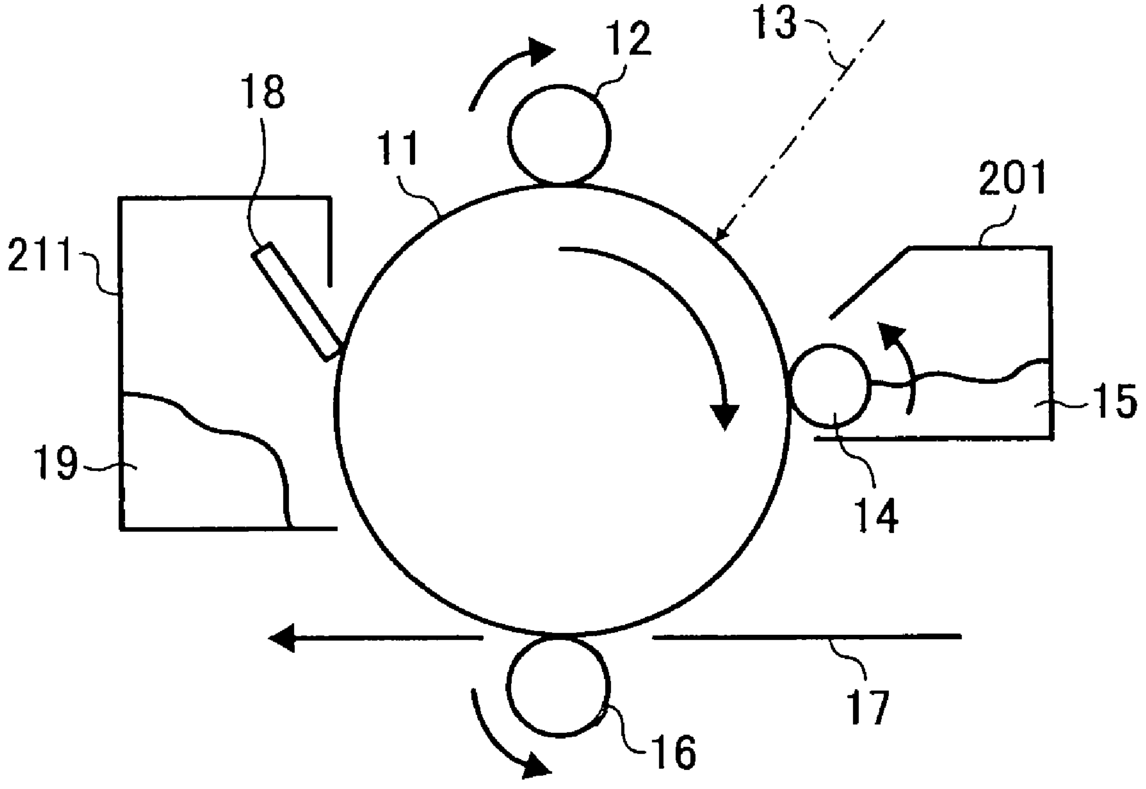
FIG. 1 PRIOR ART
FIG. 1 is a schematic illustration of an electrophotographic image forming apparatus.
Figure 2:
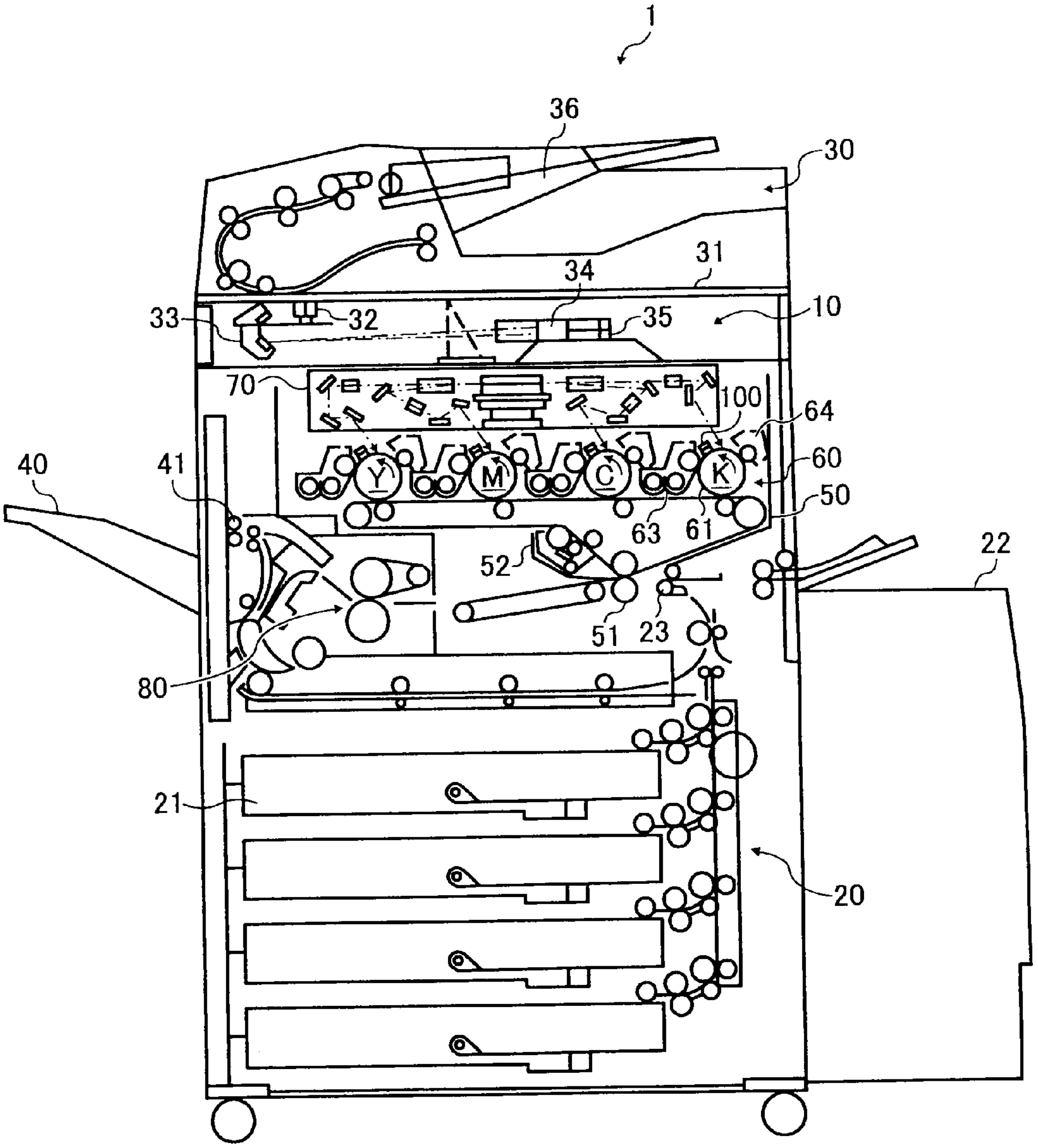
FIG. 2 is a schematic illustration showing the configuration of a charger unit using an electroconductive member according to an embodiment of the present invention as a charging member.
Figure 3:
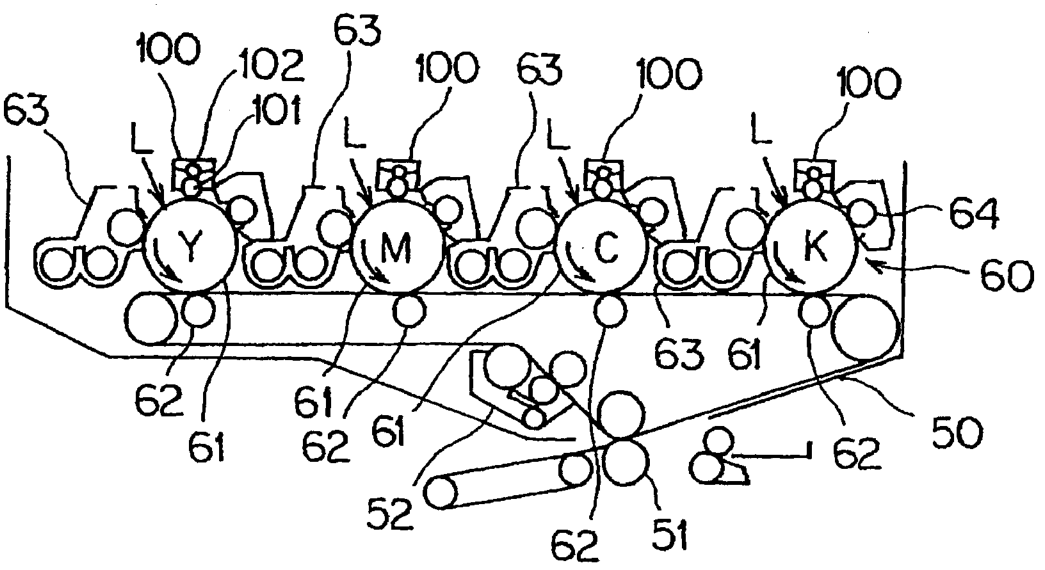
FIG. 3 is a schematic illustration showing the configuration of the image forming apparatus using a process cartridge according to the embodiment of the present invention.

FIG. 2 is a schematic illustration showing a structure of a charger unit using an electroconductive member according to the embodiment of the present invention as a charging member, and the configuration of an image forming apparatus using a process cartridge. FIG. 3 is a schematic illustration showing a structure of an image forming unit of the image forming apparatus shown in FIG. 2.

The image forming apparatus 1 includes: four image carriers (or photoconductors) 61, 61, 61 and 61 in drum form for four colors, namely, yellow (Y), magenta (M), cyan (C), and black (K), respectively, the image carriers 61 each having an image carrier layer on its surface; a charger unit 100 that substantially uniformly electrifies the image carriers 61; an exposure unit 70 that exposes the charged image carriers 61 to laser light to form electrostatic latent images on the image carriers 61; four developing units 63, 63, 63 and 63 that form toner images corresponding to the electrostatic latent images on the image carriers 61, the developing units 63 accommodating developers for the four colors, namely, yellow, magenta, cyan, and black, respectively; four primary transfer units 62, 62, 62 and 62 that transfer the toner images on the image carriers 61; an intermediate transfer unit 50 in belt form to which the toner images on the image carriers 61 are transferred; a secondary transfer unit 51 that transfers the toner images on the intermediate transfer unit 60; a fixing unit 80 that fixes the toner images on a recording medium to which the toner images on the intermediate transfer unit 50 are transferred; and four cleaning units 64 that remove the toner remaining on the image carriers 61 after the transfer.

The recording media are transported one by one on a carrying roller along a traveling route from one of paper feed units 21 and 22 that accommodate the recording media to a resist roller 23, which in turn carries the recording medium to a transfer position in synchronization with the toner images on the image carriers 61.

As shown in FIG. 2, the exposure unit 70 of the image forming apparatus 1 irradiates the image carriers 61 electrified by the charger unit 100 with light L to form the electrostatic latent images on the image carriers 61 having photoconductivity. The light L is, for example, a laser light beam or the like emitted by a lamp such as a fluorescent lamp or a halogen lamp or a semiconductor device such as an LED (light emitting diode) or an LD (laser diode). At this point, irradiation with the light L takes place in synchronization with the speed of rotation of the image carriers 61 under a signal from an image processing unit (not shown). In this case, therefore, the LD device is used.

The developing unit 63 has a developer carrier. The toner stored in the developing unit 63 is carried on a feed roller to an agitator. The carried toner is mixed and agitated with the developer containing a carrier that is a magnetic particle for carrying the toner to the image carrier. Thereafter, the toner is carried to a developing region facing the image carrier 61. The toner becomes charged during mixing and agitation, and the charged toner is transferred from the developing region to the electrostatic latent image on the image carrier 61 to develop the electrostatic latent image. Either a magnetic or nonmagnetic one-member developer, or a combination of both can be used as the developer, or a wet developing solution may be used as the developer.

The primary transfer units 62, on their undersides, form an electric field of opposite polarity to the polarity of the toner to transfer the developed toner images on the image carriers 61 to the intermediate transfer unit 50. The primary transfer units 62 can be any of a corotron, scorotron corona transferer, a transfer roller, and a transfer brush.

After that, the toner images are transferred to the recording medium by the secondary transfer unit 51, in synchronization with the recording medium from the paper feed unit 22. At this point, the toner images are not first transferred to the intermediate transfer unit 50 but may be transferred directly to the recording medium.

The fixing unit 80 applies heat and/or pressure to the toner images on the recording medium to fix the toner images on the recording medium. At this point, the fixing unit 80, during the passage of the recording medium through a pair of pressure and fixing rollers, applies heat and pressure to the recording medium to fix the toner on the recording medium, while fusing a bonding resin of the toner onto the recording medium. The fixing unit 80 is not in roller form but may be in belt form, or the fixing unit 80 may use a halogen lamp or the like for heat irradiation for fixing.

The cleaning units 64 for the image carriers 61 remove the toner remaining on the image carriers 61 without being transferred to permit next image formation. A blade made of urethane or other rubber, a cleaning brush made of polyester or other fibers, or the like can be used as the cleaning unit 64.

Description will be given below with regard to the operation of the image forming apparatus 1 according to one embodiment of the present invention.

An original is first placed on an original plate of an original carrying unit 36 of a reader 30, or the original carrying unit 36 is opened to place the original on contact glass 31 and the original carrying unit 36 is closed to cover the original.

When a start switch (not shown) is then pressed down, first and second read traveling units 32 and 33 travel after the original is transported onto the contact glass 31 if the original is placed on the original carrying unit 36, or the first and second read traveling units 32 and 33 travel immediately if the original is placed on the contact glass 31.

The first read traveling unit 32 operates in such a manner that light is emitted to the original surface from a light source provided in the first read traveling unit 32 and the light reflected from the original surface is further reflected and directed to the second read traveling unit 33.

Then, the second read traveling unit 33 operates in such a manner that the reflected light is reflected from a mirror through an image forming lens 34 to a CCD (charge coupled device) 35 that is a read sensor. Then, incoming light image information is read by the CCD 35 and is transmitted to a controller.

Under control of the controller based on the image information received from the reader 30, the LD or LED or the like (not shown) disposed in the exposure unit 70 of an image forming unit 60 emits laser light L2 for writing to irradiate the image carriers 61 with the laser light L2. This irradiation yields the electrostatic latent images on the surfaces of the image carriers 61.

A paper feeder 20 operates in such a manner that the recording medium is dispensed from the multilevel paper feed cassette 21 by a paper feed roller, that the dispensed recording medium is separated by a separation roller and is delivered to a paper feed path, and that the recording medium is transported on the carrying roller to the paper feed path of the image forming unit 60.

Besides paper feeding by the paper feeder 20, manual paper feed may take place. The image forming apparatus 1 is provided on its side with a manual paper feed tray for the manual paper feed, and a separation roller that separates the recording media, one by one, on the manual paper feed tray to direct the recording medium to a manual paper feed path for paper feeding.

The resist roller 23 of the image forming apparatus 1 ejects only one of the recording media placed in the paper feed cassette 21, and feeds the recording medium to a secondary transfer unit located between the intermediate transfer unit 50 and the secondary transfer unit 51. When the controller receives the image information from the reader 30, the image forming unit 60 performs laser writing and developing process as mentioned above to form the electrostatic latent images on the image carriers 61.

The developer (or the toner and the carrier (or the magnetic particle) having the toner adhering thereto) within the developing unit 63 is drawn and held by a magnetic pole (not shown) to form a magnetic brush made of a string of magnetic particles on the developer carrier. The developer further acts in such a manner that the toner is transferred to the image carrier 61 through the application of a developing bias voltage to the developer carrier to make visible the electrostatic latent image on the image carrier 61, and thereby form the toner image.

The developing bias voltage is a superposition of an alternating voltage and a direct voltage. Then, one of the paper feed rollers of the paper feeder 20 operates in order to feed the recording medium of size depending on the toner image. Moreover, a driving motor rotatably drives one of support rollers incident to the operation of the paper feed roller, and this leads to coupled rotatable driving of two other support rollers, and hence to rotatable transport of the intermediate transfer unit 50.

At the same time, the individual image forming units form mono-color images, namely, black, yellow, magenta and cyan color images, on each of the image carriers 61, by rotation of the image carriers 61. Concurrently with the transport of the intermediate transfer unit 50, the mono-color images are then transferred in sequence to the intermediate transfer unit 50 to form a composite toner image on the intermediate transfer unit 50.

When one of the paper feed rollers of the paper feeder 20 is selectively rotated, the recording media are dispensed from one of the paper feed cassettes 21, and the recording media, one by one, are separated and delivered into the paper feed path by the separation roller. The carrying roller guides the recording medium to the paper feed path in the image forming unit 60 of the image forming apparatus 1, and strikes the recording medium against the resist roller 23 to stop the recording medium.

When the resist roller 23 then rotates with the timing of the composite toner image on the intermediate transfer unit 50, the recording medium is fed into the secondary transfer unit that is an abutment between the intermediate transfer unit 50 and the secondary transfer unit 51. The secondary transfer unit secondarily transfers the toner image to the recording medium to record the toner image on the recording medium, by the influence of a secondary transfer bias, an abutment pressure, or the like formed in the secondary transfer unit.

At this point, it is desirable that the secondary transfer bias be a direct voltage. The recording medium having the toner image transferred thereto is fed into the fixing unit 80 by a conveyor belt of the secondary transfer unit 51. In the fixing unit 80, the toner image is fixed on the recording medium through the application of pressure and heat by the pressure roller. Thereafter, the recording medium is delivered onto a receiving tray 40 by a delivery roller 41.

(Process Cartridge)

A detailed description will now be given with regard to the charger unit 100 using the electroconductive member according to the embodiment of the present invention as the charging member.

Figure 4:
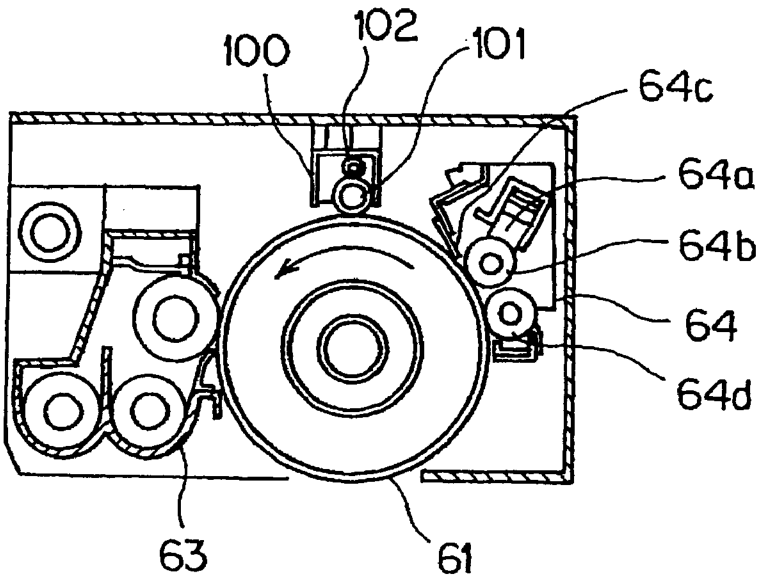
FIG. 4 is a schematic illustration showing the configuration of the charger unit using the electroconductive member according to the embodiment of the present invention as the charging member, and the configuration of the process cartridge.

FIG. 4 is a schematic illustration showing the configuration of the charger unit using the electroconductive member according to the embodiment of the present invention as the charging member, and the configuration of the process cartridge.

The process cartridge includes at least the image carrier 61, the charger unit 100, and the cleaning unit 64, or may further include the developing unit 63 as shown in FIG. 4. This process cartridge in itself is detachably attached integrally to the image forming apparatus.

Referring to FIG. 4, the surfaces of the image carriers 61 are uniformly electrified by a charging member 101 disposed without contact with an image forming region. The images (or the electrostatic latent images) are formed on the surfaces of the image carriers 61 and are then made visible by the developing process to form the toner images, which in turn are transferred to the recording medium. The toner remaining on the image carriers 61 without being transferred to the recording medium is recovered by an auxiliary cleaning member 64*d*.

Then, a solid lubricant 64*a* is uniformly applied to the image carrier 61 by a coating member 64*b* to form a lubricant layer, in order to prevent the toner and its constituent material from adhering to the surface of the image carrier 61.

Then, the unrecovered toner is recovered by the auxiliary cleaning member 64*d* of a cleaning member 64*c* and is carried to a waste toner recovery unit. The auxiliary cleaning member 64*d* can be in roller or brush form. Fatty acid metal salt such as zinc stearate, polytetrafluoroethylene, or the like, for example, can be used for the solid lubricant 64*a*. However, the solid lubricant 64*a* is not limited to the above but may be made of any material, provided that it can reduce a coefficient of friction on the image carrier 61 and thus impart non-adhesion to the image carrier 61. A blade made of silicone, urethane or other rubber, a cleaning brush made of polyester or other fibers, or the like, for example, can be used as the cleaning member 64*c*.

The charger unit 100 is provided with a cleaning member 102 for removing contamination of the charging member 101. Although the cleaning member can be in roller or pad form, the cleaning member as employed in the embodiment is in roller form.

The cleaning member 102 is fitted and rotatably and pivotally supported on a bearing disposed in a housing (not shown) of the charger unit 100. The cleaning member 102 abuts the charging member 101 to clean the outer periphery of the charging member 101.

If foreign matter, such as the toner, paper particles, or a broken piece of the member, adheres to the surface of the charging member 101, an electric field for electrifying the image carrier 61 converges on an area containing the foreign matter, resulting in anomalous discharge involving preferential discharge. Conversely, if electrically insulating foreign matter adheres to the surface of the charging member 101 over its wide range, discharge does not occur in this area, so that the image carrier 61 becomes nonuniformly charged. Desirably, the charger unit 100 is therefore provided with the cleaning member 102 for cleaning the surface of the charging member 101.

A brush made of polyester or other fibers, or a porous material (e.g., sponge) such as a melamine resin, for example, can be used for the cleaning member 102. The cleaning member 102 rotates with a differential peripheral velocity as following the rotation of the charging member 101, or the cleaning member 102 may intermittently rotate clear of the charging member 101.

The charger unit 100 is also provided with a power supply that applies a voltage to the charging member 101. Although a direct voltage alone can be used as the voltage, it is desirable that the voltage be a superposition of a direct voltage and an alternating voltage.

If the charging member 101 is nonuniform in laminar configuration, the application of the direct voltage alone to the charging member 101 can possibly result in a nonuniformity in the surface potential of the image carrier 61. The application of the superposed voltage to the charging member 101 leads to potential equalization of the surface of the charging member 101, thus stabilizes discharge from the charging member 101, and thus enables the surface of the image carrier 61 can become uniformly charged. Desirably, the superposed voltage is set so that the peak-to-peak voltage of the alternating voltage is two or more times an electrification start voltage for the image carrier 61. As employed herein, the electrification start voltage refers to the absolute value of the voltage at which the image carrier 61 starts becoming charged when the direct voltage alone is applied to the charging member 101. The above setting leads to reverse discharge from the image carrier 61 to the charging member 101, so that the surface of the image carrier 61 can become uniformly charged with higher stability by the effect of the reverse discharge making electrification even.

Desirably, the frequency of the alternating voltage is seven or more times the peripheral velocity (or process speed) of the image carrier 61. When the frequency is seven or more times the peripheral velocity, a moire image becomes unrecognizable or visually unrecognizable.

In the embodiment of the present invention, the auxiliary cleaning member 64*d* is configured of a brush roller, the lubricant is made of a block of zinc stearate, and the brush roller 64*d* that is the coating member is rotated as pressed against the lubricant by a pressuring member such as a spring, to thereby cut away the solid lubricant from the solid lubricant block that is the lubricant and apply the solid lubricant to the image carrier 61.

A urethane blade is used as the cleaning member and is of a counter type. A sponge roller made of a melamine resin is used as the cleaning member for the charging member 101. The cleaning member is of a type which rotates as following the rotation of the charging member, and thereby enables excellently cleaning off contamination of the surface of the charging member 101.

Figure 5:
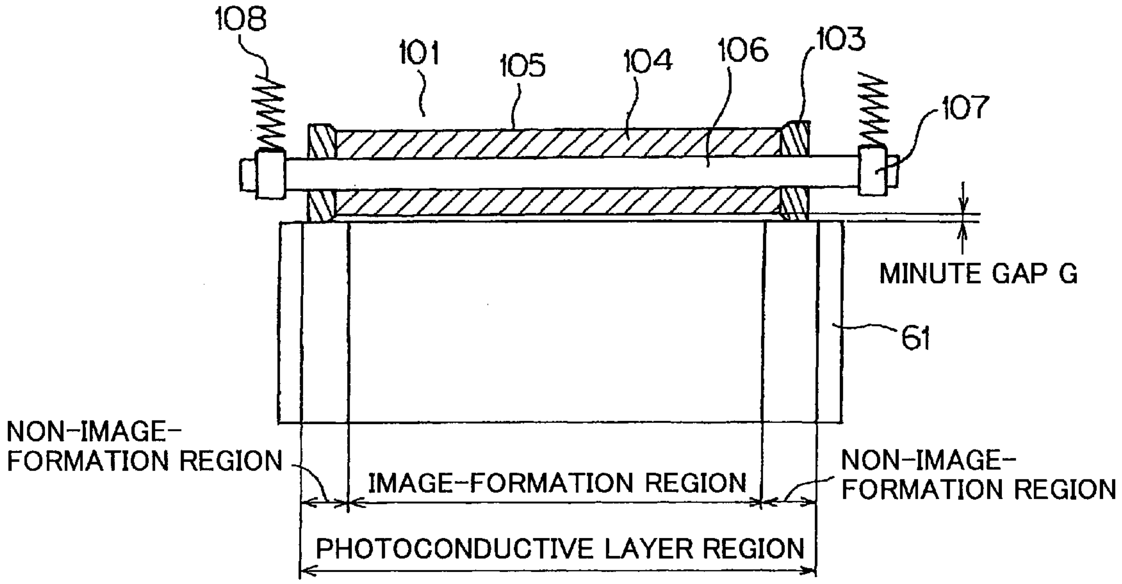
FIG. 5 is a schematic illustration showing the relative positions of a photoconductive layer region, an image-formation region, and a non-image-formation region of the charging member that is the electroconductive member according to the embodiment of the present invention, and an image carrier.

FIG. 5 is a schematic illustration showing the relative positions of a photoconductive layer region, an image-formation region, and a non-image-formation region of the charging member 101 that is the electroconductive member according to the embodiment of the present invention, and the image carrier 61.

As shown in FIGS. 3 and 4 the charger unit 100 includes at least the charging member 101 disposed as facing the image carrier 61 with a minute gap G therebetween; the cleaning member 102 that cleans the charging member 101; the power supply (not shown) that applies a voltage to the charging member 101; and a pressure spring (not shown) that presses the charging member 101 against the image carrier 61 to bring the charging member 101 into contact with the image carrier 61.

As shown in FIGS. 4 and 5, the charging member 101 is disposed as facing the image carrier 61 with the minute gap G therebetween. To form the gap G between the charging member 101 and the image carrier 61, a gap holding member 103 abuts against a non-image-formation region of the charging member 101. The gap holding member 103 abuts against the photoconductive layer region of the image carrier 61 to thereby enable preventing variations in the gap even at the occurrence of variations in the coating thickness of the photoconductive layer.

As shown in FIG. 5, in the charging member 101, the gap holding members 103 are disposed on both ends of an electric resistance adjusting layer 104 formed on an electroconductive support 106. Moreover, a cap layer 105 is formed on the electric resistance adjusting layer 104 so as to prevent the toner and toner additive from adhering to the surface of the layer 104.

The charging member 101 is not particularly limited but may be in belt, blade or plate, or semicylindrical form and be fixedly disposed. Alternatively, the charging member 101 may be in cylindrical form and be rotatably supported at both ends on gears or bearings.

When the charging member 101 is formed by a curved surface that gradually gets clear of a portion in closest proximity to the image carrier 61 upstream and downstream in the direction of movement of the image carrier 61, the surface of the image carrier 61 can become more uniformly charged. If a sharp portion is present on the surface of the charging member 101 facing the image carrier 61, a rise in the potential occurs in the portion, thus starts preferential discharge therein, and thus makes it difficult for the surface of the image carrier 61 to become uniformly charged. When the charging member 101 is of cylindrical shape and also has the curved surface, the image carrier 61 can therefore become uniformly charged.

The discharge surface of the charging member 101 undergoes strong stress. Since the discharge occurs on the surface in the same portion at all times, deterioration is accelerated in this portion, and moreover, the degraded portion can possibly be cut away. When the charging member 101 is rotated so that its overall surface can be used for discharge, it is therefore possible to prevent the charging member 101 from deteriorating at an early stage and hence use the charging member 101 over the long term.

(Gap and Gap Formation Method)

When the gap G between the charging member 101 and the image carrier 61 is set by the gap holding member 103 so as to be equal to or less than 100 μm or particularly lies between about 5 and 70 μm, it is possible to suppress anomalous image formation during the operation of the charger unit 100.

The width of the gap G of 100 μm or more increases a distance which electricity produced by the charging member 101 travels until reaching the image carrier 61. In other words, the large gap G raises a discharge start voltage following Paschen's law. Since the large gap G further enlarges discharge space between the charging member 101 and the image carrier 61, predetermined electrification of the image carrier 61 requires discharge to yield a large amount of discharge products, and thus, the discharge products remain in the discharge space in large amounts even after image formation, adhere to the image carrier 61, and become the cause of accelerated proceeding of aging in the image carrier 61.

The gap G of narrow width reduces the distance which the electricity produced by the charging member 101 travels until reaching the image carrier 61, and thus the image carrier 61 can become charged even if discharge energy is low. However, the narrow gap G narrows the space formed between the charging member 101 and the image carrier 61 and thus impairs a flow of air through the space.

Accordingly, the discharge products formed in the discharge space remain in the discharge space in large amounts even after image formation, adhere to the image carrier 61, and become the cause of accelerated proceeding of aging in the image carrier 61, as in the case of the large gap G.

Desirably, therefore, the discharge energy is reduced to reduce the production of discharge products, and the space is such that air does not stay in the space. Desirably, therefore, the width of the gap G is set so that the width is equal to or less than 100 μm or lies between 5 and 70 μm.

This enables preventing the occurrence of streamer discharge, thus reducing the production of discharge products, thus reducing the amount of discharge products deposited on the image carrier 61, and thus preventing the appearance of a spotted image, a running image, or the like.

At this point, the toner remaining on the image carrier 61 after development is removed by the cleaning unit 64 disposed as facing the image carrier 61, but the toner is not completely removed, and thus traces of toner pass through the cleaning unit 64 and to the charger unit 100.

At this time, if the grain size of the toner is larger than the gap G, the above toner can possibly be fused to the charging member 101 by being heated by being rubbed against the rotating image carrier 61 or charging member 101.

If the toner is fused to the charging member 101, the charging member 101 is brought close to the image carrier 61 correspondingly by the amount of the fused toner, and thus anomalous discharge occurs and causes preferential discharge in a place where the toner is fused. Desirably, therefore, the width of the gap G is set so that the width is larger than the maximum grain size of the toner for use in the image forming apparatus 1.

The electroconductive support 106 of the charging member 101 is rotatably fitted at both ends in bearings 107 disposed on side plates of the housing (not shown) of the charger unit 100, as shown in FIG. 5. The bearing 107 is made of a resin having a low coefficient of friction and is pressed toward the image carrier 61 by a compression spring 108.

This makes it possible to form the fixed gap G even at the occurrence of mechanical vibrations or offset of the image carrier 61. A load imposed on the charging member 101 by the compression springs 108 is set, for example, at 4 to 25 N, or desirably at 6 to 15 N. Although the charging member 101 is fixedly located by being pivotally supported on the bearings 107, the width of the gap G can possibly fill outside a proper range due to vibrations during rotation of the charging member 101, offset of the charging member 101, and variations in the width of the gap G due to asperities on the surface thereof and this results in accelerated proceeding of aging in the image carrier 61.

As employed herein, the load refers to every load applied to the image carrier 61 through the gap holding member 103. Forces exerted by the compression springs 108 disposed on both ends of the charging member 101, the weight of the charging member 101 and the cleaning member 102 on their own, or the like can be used to adjust the load. A light load makes it impossible to suppress variations during rotation of the charging member 101 or a rebound of the driven gears or the like by impact forces. A heavy load leads to an increase in the friction between the charging member 101 and the fitting bearings 107 and hence to an increase in aging abrasion wear, resulting in acceleration of variations.

Accordingly, the load lying between 4 and 25 N or desirably between 6 and 15 N can achieve the width of the gap G falling within the proper range, thus reduce the production of discharge products, thus reduce the amount of discharge products deposited on the image carrier 61, and thus increase the longevity of the image carrier 61. This enables preventing an anomalous spotted image or a running image from appearing.

The gap holding member 103 is partially different in level from the electric resistance adjusting layer 104. A method for forming a gap between the electric resistance adjusting layer 104 and the gap holding member 103 can be accomplished by simultaneously machining the electric resistance adjusting layer 104 and the gap holding member 103 by means of machining for removal, such as cutting or grinding. The simultaneous machining makes it possible to form the gap with high precision.

When an end of the gap holding member 103 adjacent to the electric resistance adjusting layer 104 is formed so that the end is at or below the level of the electric resistance adjusting layer 104, a reduction in the width of contact between the gap holding member 103 and the image carrier 61 is achieved, thus enabling high-precision formation of the gap between the charging member 101 that is the electroconductive member and the image carrier 61.

This configuration can prevent the outer surface of the end of the gap holding member 103 toward the electric resistance adjusting layer 104 from abutting the image carrier 61. The configuration can also prevent the occurrence of a leakage of current due to the adjacent electric resistance adjusting layer 104 coming into contact with the image carrier 61 with the above end in between.

When the end of the gap holding member 103 toward the electric resistance adjusting layer 104 is machined so as to be at lower level, the end can be used as a relief for a cutting edge or the like for the removal.

Incidentally, the relief can be of any shape, provided that the shape is such that the outer surface of the end of the gap holding member 103 does not abut the image carrier 61.

When coating is used to form the top surface layer (or cap layer) 105 of the electric resistance adjusting layer 104, masking can take place in order that an unwanted area is not coated. However, it is difficult to perform control for precise masking such that the masking extends to the position of a boundary between the electric resistance adjusting layer 104 and the gap holding member 103, allowing for variations in the position of the boundary therebetween. Thus, prior to the grinding of the gap holding member 103, the top surface layer 105 is formed as extending to the end of the electric resistance adjusting layer 104 in contact with the gap holding member 103. This can ensure that the top surface layer 105 is formed only on the electric resistance adjusting layer 104.

(Regarding Gap Holding Member)

The gap holding member 103 requires the property of holding the gap G between the gap holding member 103 and the image carrier 61 with stability over the long term (or over time) in environment. To achieve the characteristics, it is desirable that the gap holding member 103 be made of a material having low moisture absorption and high wear resistance.

Moreover, important properties for the gap holding member 103 include the property of resisting adhesion of the toner and the toner additive, and the property of avoiding the wearing away of the image carrier 61 in order for the gap holding member 103 to slide as abutting the image carrier 61. The properties are appropriately selected according to various conditions.

The gap holding member 103 is made as specific examples of a general purpose type resin such as polyethylene (PE), polypropylene (PP), polyacetal (e.g., POM (polyoxymethylene)), polymethyl methacrylate (PMMA), polystyrene (PS), or a copolymer thereof (e.g., an AS (acrylonitrile-styrene) resin or an ABS (acrylonitrile butadiene styrene) resin), polycarbonate (PC), a urethane resin, a fluorocarbon resin (e.g., PTFE (polytetrafluoroethylene)), or the like.

The gap holding member 103 can be adhesively bonded to the electroconductive support 106, particularly in order to ensure that the gap holding member 103 is fixed to the electroconductive support 106. Desirably, the gap holding member 103 is made of an insulating material, and desirably, the gap holding member 103 has a volume resistivity of 10^13Ω cm or more. The reason that the gap holding member 103 should have insulating properties is to eliminate the occurrence of a leakage of current between the gap holding member 103 and the image carrier 61. The gap holding member 103 is formed by molding.

(Regarding Electric Resistance Adjusting Layer)

The electric resistance adjusting layer 104 is made of a thermoplastic resin compound having a high polymeric ion conductive material dispersed therein. Desirably, the electric resistance adjusting layer 104 has a volume resistivity of $10^6$ to $10^9$Ω cm. The volume resistivity in excess of $10^9$Ω cm renders insufficient the capability of the charging member 101 electrifying the image carrier 61 or the capability of transferring the toner image (or the amount of toner transfer). A volume resistivity of less than $10^6$Ω cm leads to the occurrence of a leakage due to a voltage converging on the entire image carrier 61.

Although the thermoplastic resin for use in the electric resistance adjusting layer 104 is not particularly limited, a general purpose type resin such as polyethylene (PE), polypropylene (PP), polymethyl methacrylate (PMMA), polystyrene (PS), a copolymer thereof (e.g., an AS resin or an ABS resin), polyamide, or polycarbonate (PC), for example, is desirable because of facilitating molding.

A macromolecular compound containing a polyetheresteramide ingredient, for example, is desirable for the high polymeric ion conductive material dispersed in the thermoplastic resin. The polyetheresteramide is an ion conductive high polymeric material, and is uniformly dispersed and immobilized at the molecular level in a matrix polymer.

Accordingly, the thermoplastic resin having dispersed therein the macromolecular compound containing the polyetheresteramide ingredient does not undergo variations in resistance value involved in poor dispersion as observed in a compound having dispersed therein an electron conduction type electroconductive material such as metal oxide or carbon black. Application of a high voltage to the electroconductive member made of the thermoplastic resin having the electron conduction type electroconductive material dispersed therein leads to local formation of a path prone to electricity flow, and thus causes the occurrence of a leakage of current to the image carrier 61, resulting in the appearance of an anomalous image, specifically, white and black spotted images, if the charging member 101 is used.

The polyetheresteramide is resistant to bleed out because of being the high polymeric material. The composition of the electric resistance adjusting layer 104 must be 20 to 70 weight percent of thermoplastic resin and 80 to 20 weight percent of high polymeric ion conductive material, since it is necessary to set the resistance value to a desired value.

Furthermore, an electrolyte (e.g., salt) may be added to the electric resistance adjusting layer 104 in order to adjust the resistance value of the electric resistance adjusting layer 104. Examples of the salt include alkali metal salt such as sodium perchlorate and lithium perchlorate, and quaternary phosphonium salt such as ethyltriphenylphosphonium tetrafluoroborate and tetraphenylphosphonium bromide.

The electroconductive material mentioned above may be used alone or a blend of plural electroconductive materials may be used, unless physical properties are impaired. A compatibilizer may be appropriately used in order that the electroconductive material is uniformly dispersed at the molecular level in the matrix polymer.

Addition of the compatibilizer enables micro-dispersion of the electroconductive material. Examples of the compatibilizer include the compatibilizer having a glycidyl methacrylate group that is a reactive group. Besides the above, an additive such as an antioxidant may be used unless physical properties are impaired.

The resin compound is not particularly limited in manufacturing method therefor but may be easily manufactured by mixing materials and melting and kneading the materials by a biaxial kneader, a kneader, or the like.

When the electroconductive support 106 is coated with the above-mentioned electroconductive resin compound by extrusion molding, injection molding, or other means, the electric resistance adjusting layer 104 can be easily formed on the electroconductive support 106.

When the electric resistance adjusting layer 104 alone is formed on the electroconductive support 106 to form the electroconductive member, the toner and the toner additive or the like can possibly adhere to the electric resistance adjusting layer 104 and thus cause deterioration in electrification performance. To prevent this problem from arising, the top surface layer 105 can be formed on the electric resistance adjusting layer 104.

(Regarding Top Surface Layer)

For a material for the top surface layer 105, a fluorocarbon base resin, a silicone base resin, a polyamide resin, a polyester resin, or the like, for example, is desirable in terms of prevention of toner adhesion because of being excellent in non-adhesion. Formation of the top surface layer 105 on the electric resistance adjusting layer 104 is accomplished by any of various coating methods such as spray coating, dip coating, and roll coating, using a coating prepared by dissolving the above constituent material for the top surface layer in an organic solvent. Desirably, the top surface layer 105 has a layer thickness in the order of about 10 μm to about 30 μm.

Although either of one-member and two-member coatings can be used as the constituent material for the top surface layer 105, the use of the two-member coating in combination with a hardener enables improvements in environmental resistance, non-adhesion and mold release characteristics of the top surface layer 105. For the two-member coating, a general method involves heating a coating film and thereby cross-linking and curing the resin.

However, the electric resistance adjusting layer 104 cannot be heated at high temperatures because of being made of the thermoplastic resin. For the two-member coating, it is effective to use a main ingredient having a hydroxy group in a molecule, and an isocyanate base resin that undergoes a cross-linking reaction with the hydroxy group.

Examples of the isocyanate base resin include a polyisocyanate resin, specifically, 2,4-tolylene diisocyanate, diphenylmethane-4,4'-diisocyanate, xylylene diisocyanate, isophorone disocyanate, lysinemethylester diisocyanate, methylcyclohexyl diisocyanate, trimethylhexamethylene diisocyanate, hexamethylene diisocyanate, n-pentane-1,4-diisocyanate, a trimer of these, an adduct or bullet of these, a polymer of these having two or more isocyanate groups, and blocked isocyanate. However, the isocyanate base resin is not limited to these.

When the isocyanate base resin is used, the resin undergoes cross-linking and curing reactions at relatively low temperatures of 100° C. or lower. Hardener loading is 0.1 to 5 or desirably 0.1 to 1.5 by equivalent weight of a functional group (or —OH group).

Besides the above, a hardener made of an amino resin such as a melamine or guanamine resin may be appropriately used according to the heat resistance of the matrix. Desirably, the resin for the top surface layer 105 is the silicone base resin or the fluorocarbon base resin in terms of non-adhesion of the toner.

Desirably, the top surface layer 105 of the electroconductive member is electrically conductive, because electrical properties (i.e., the resistance value) are important for the electroconductive member. To render the top surface layer 105 electrically conductive, an electroconductive material can be dispersed in a resin material.

The electroconductive material is not particularly limited. Examples of the electroconductive material include electroconductive carbon such as ketjen black EC and acetylene black, carbon for rubber such as SAF, ISAF, HAF, FEF, GPF, SRF, FT, and MT, oxidized or otherwise processed carbon for color, pyrolytic carbon, metal and metal oxide such as indium-tin-oxide (ITO), tin oxide, zinc oxide, copper, silver, and germanium, and an electroconductive polymer such as polyaniline, polypyrrole, and polyacetylene.

Examples of the material for imparting electrical conductivity also include an ion electroconductive substance, specifically, an inorganic ionic electroconductive substance such as sodium perchlorate, lithium perchlorate, calcium perchlorate, and lithium chloride, quarternary phosphonium salt such as ethyltriphenylphosphonium tetrafluoroborate and tetraphenylphosphonium bromide, and an organic ionic electroconductive substance such as denatured fatty dimethylammoniumethosulfate, ammonium acetate stearate, and lauryl ammonium acetate.

The above electroconductive material may be used alone or a blend of plural electroconductive materials may be used, unless physical properties are impaired. To disperse the electroconductive material in the coating resin for use in the top surface layer 105, a known method can be employed, using a dispersion medium such as a glass bead or a zirconia bead in a ball mill, a paint shaker, a bead mill, or the like.

(Regarding Oxygen-Containing Inorganic Compound)

An oxygen-containing inorganic compound for use in the embodiment of the present invention is selected from among a composite oxide of silicon and aluminum, an oxygen-containing silicon compound, and an oxygen-containing aluminum compound. At this point, one or more compounds can be selected for use.

Examples of the oxygen-containing silicon compound include a silica compound such as silicon dioxide ($SiO_2$). Examples of the oxygen-containing aluminum compound include aluminum oxide ($Al_2O_3$) and aluminum hydroxide ($Al(OH)_3$).

Examples of the composite oxide of silicon and aluminum include aluminosilicate as represented as Formula (1)

$$M_{x/n}[(AlO_2)_x(SiO_2)_y]zH_2O \quad (1)$$

where M represents a metal cation having a valence of n, x+y represents the number of tetrahedrons per unit cell, and z represents the number of moles of a molecule of water.

This aluminosilicate is generally called "zeolite" or "molecular sieves," is a porous crystalline substance, and can take on crystal structures in which the size of a hole varies according to the x and y values in Formula (1). Adsorbed molecules vary according to the size of the hole.

Examples of composite metal silicate include zirconium silicate ($ZrSiO_4$), talc (water-containing magnesium silicate), and mica.

An oxidative substance (or oxidative gas) such as ozone is decomposed by a catalyst. For example, when the oxygen-containing inorganic compound comes into contact with the ozone, the compound acts as the catalyst to accelerate a decomposition reaction for decomposing the ozone into oxygen, as expressed by Parts (a) and (b) of Formula (2). Of the oxygen-containing inorganic compounds, the aluminosilicate is desirable. The reason is as follows: the aluminosilicate is porous, and the oxidative gas such as the ozone is adsorbed into the hole, so that the above catalyst function is more effectively performed.

Formula 2

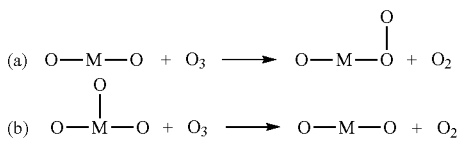

In Formula (2), M represents the oxygen-containing inorganic compound.

One or more oxygen-containing inorganic compounds selected from among the composite oxide of silicon and aluminum, the oxygen-containing silicon compound, and the oxygen-containing aluminum compound, as mentioned above, are added to the top surface layer 105 of the electric resistance adjusting layer 104. This enables acceleration of decomposition of oxidative gases such as ozone or $NO_x$ produced by discharge to the image carrier 61 through the application of a high voltage or enables adsorption of the oxidative gases, thus making it possible to reduce aging (or deterioration in performance) in the surface of the electroconductive member due to the oxidative gases.

When the oxygen-containing inorganic compound is used in fine-grained or otherwise grained form, the compound can be held as dispersed within the top surface layer 105. The oxygen-containing inorganic compound held on and near the surface of the top surface layer 105 comes into contact with the oxidative gases such as ozone or $NO_x$ lying outside the top surface layer 105.

Desirably, the average grain size of the oxygen-containing inorganic compound is equal to or less than 15 μm, or more desirably 10 μm. A fine grain as small as 10 μm or less leads to the grain having a sufficiently large surface area, thus enabling a significant improvement in the efficiency of adsorption and decomposition of oxidative gases such as ozone or $NO_x$ produced by discharge to the image carrier 61 through the application of a high voltage to the electroconductive member.

The average grain size of the oxygen-containing inorganic compound exceeding 10 μm increases the degree of surface roughness of the electroconductive member, thus makes it difficult to clean off and remove deposits such as the toner in asperities on the surface or the constituent material for the toner, and thus increases the likelihood of image degradation (or inconsistencies in density) occurring.

Figure 6:
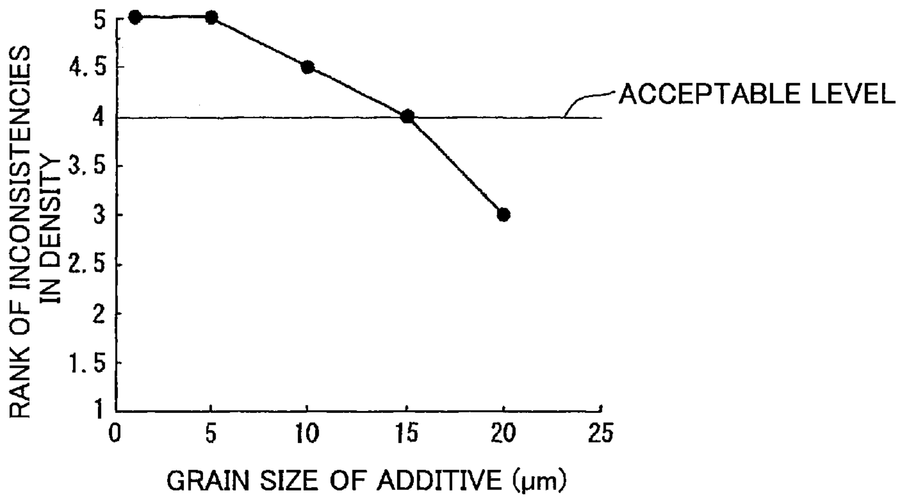
FIG. 6 is a graph showing the relation between the grain size and the level of inconsistencies in image density in an instance where silicon dioxide is added to a top surface layer so as to contain 15 wt % silicon dioxide.

FIG. 6 shows the relation between the grain size and the inconsistencies in image density in an instance where silicon dioxide is added to the top surface layer 105 so that the top surface layer 105 contains 15 wt % silicon dioxide. As can be seen from FIG. 6, the average grain size of the oxygen-containing compound of 15 μm or greater satisfies rank 4 or higher in the rank of inconsistencies in image density, which is acceptable practical level. The average grain size of the oxygen-containing compound of 10 μm or less achieves rank 5 in the rank of inconsistencies in image density, which presents no problem.

As employed herein, the rank of inconsistencies in image density is determined by visual observation. Table 1 gives the relation between criteria for judgment and ranks and the presence or absence of practicability for the image forming apparatus.

TABLE 1

| Rank of inconsistencies in image density | Criteria | Evaluation of practicability Practicable: o, Impracticable: x |
|---|---|---|
| 1 | Dark throughout entire area | x |
| 1.5 | Somewhat dark throughout entire area | x |
| 2 | Dark at both ends, and light in other places | x |
| 2.5 | Dark at both ends, and somewhat dark at center | x |
| 3 | Dark at both ends, and somewhat light at center | x |
| 3.5 | Dark at both ends | x |
| 4 | Dark at either one of ends | o |
| 4.5 | Slight inconsistencies in density | o |
| 5 | No inconsistencies in density | o |

The content of the oxygen-containing inorganic compound in the top surface layer 105 can be set to any content, provided that the properties of the electroconductive member are not impaired and the top surface layer 105 can be formed.

As a method for adding the oxygen-containing compound to the material for the top surface layer, a known method can be employed using a dispersion medium such as a glass bead or a zirconia bead in a ball mill, a paint shaker, a bead mill, or the like, as in the case of the method for dispersing the electroconductive material. In this case, an assistant such as a dispersant may be appropriately used.

When the material for the top surface layer having the above oxygen-containing inorganic compound added thereto is used to form the top surface layer 105 in the same manner as a general top surface layer, the electroconductive member (or the charging member 101) according to the embodiment of the present invention can be obtained.

EXAMPLES AND COMPARATIVE EXAMPLES

The electric resistance adjusting layer 104 was formed by a procedure that involves forming a resin compound by mixing, melting and kneading (A) 40 wt % ABS resin (e.g., GR3000, which is commercially available from Denki Kagaku Kogyo Kabushiki Kaisha), (B) 60 wt % polyetheresteramide (e.g., 1RGASTAT P18, which is commercially available from Ciba Speciality Chemicals Inc.), and 4 parts by weight of polycarbonate-glycidylmethacrylate-styrene-acrylonitrile copolymer (e.g., Modiper C L440-G, which is commercially available from Nihon Oil Fat Corporation) to 100 parts by weight of (A) plus (B); and coating a support with the resin compound by injection molding, the support (of 10 mm in outer diameter) being formed of SUM (stainless steel) plated with Ni (nickel).

After that, the electric resistance adjusting layer 104 was subjected to gate cutting and length adjustment, and thereafter the gap holding members 103 of ring shape (made of a high-density polyethylene resin (e.g., Novatech PP HY540, which is commercially available from Nihon Polychem Co., Ltd.)) were force-fitted over both ends of the electric resistance adjusting layer 104. Then, the gap holding member 103 and the electric resistance adjusting layer 104 were simultaneously machined by means of cutting so as to have an outer diameter of 12.5 mm and an outer diameter of 12.4 mm, respectively.

The top surface layers 105 were formed on the electric resistance adjusting layers 104 formed in the manner as above mentioned, by a procedure that involves forming top surface layer coatings by blending and kneading by use of materials as given in Table 2, the coatings being of compositions as given in Table 3, and spray coating the coatings with a mixture made of carbon black (25 wt % to total solids). The top surface layer 105 has a layer thickness of about 10 μm. After that, the coatings were thermally cured at 80° C. for 30 minutes by a hot-air oven. In this manner, the electroconductive members were yielded.

TABLE 2

| | |
|---|---|
| 1) | Acrylic silicone resin (coat 3000VH, available from Kawakami Paint MFG Co., Ltd.) |
| 2) | Polyisocyanate base resin, T4 hardener, available from Kawakami Paint MFG Co., Ltd. |
| 3) | Molecular sieves (3A), available from Tomoe Engineering Co., Ltd. |
| 4) | Fluorocarbon base resin, Surfcure DSC-201, available from Daido Toryo Co., Ltd. |
| 5) | Polyisocyanate base resin, Surfcure hardener K-20, available from Daido Toryo Co., Ltd. |
| 6) | Zeolite (HSZ-930NHA), available from Tosoh Corporation |
| 7) | Aluminum oxide (A0-902H), available from Admatechs Co., Ltd. |
| 8) | Aluminum oxide-silicon dioxide mixture (CDK84), available from Nippon Aerosil Co., Ltd. |

TABLE 2-continued

|  |  |
|---|---|
| 9) | Zirconium silicate (SPZ), available from Hakusuitech Co., Ltd. |
| 10) | Polyvinyl butyral resin, Electrification butyral 3000K, available from Denki Kagaku Kogyo Kabushiki Kaisha |
| 11) | Polyester resin, VYLON 20SS, available from Toyobo Co., Ltd. |
| 12) | Urethane resin, ADEKA BON-TIGHTER AM36, available from ADEKA |

TABLE 3

| | Resin (a) | | Resin (b) | | Oxygen-containing inorganic compound for use | | |
|---|---|---|---|---|---|---|---|
| | Type | Part by weight | | Part by weight | Type | Average grain size (μm) | Part by weight |
| Example 1 | Acrylic silicone 1) | 100 | Polyisocyanate base resin 2) | 20 | Molecular sieves (3A) 3) | 10 | 16 |
| Example 2 | Fluorocarbon base 4) | 100 | Polyisocyanate base resin 5) | 20 | Zeolite (HSZ-930NHA) 6) | 5 | 8 |
| Example 3 | Acrylic silicone 1) | 100 | Polyisocyanate base resin 2) | 20 | Aluminum oxide (A0-902H) 7) | 0.7 | 5 |
| Example 4 | Acrylic silicone 1) | 100 | Polyisocyanate base resin 2) | 20 | Silicon dioxide (R972) 8) | 0.016 | 5 |
| Example 5 | Acrylic silicone 1) | 100 | Polyisocyanate base resin 2) | 20 | Aluminum hydroxide (UFH20) 3) | 2 | 6 |
| Example 6 | Fluorocarbon base 4) | 100 | Polyisocyanate base resin 5) | 20 | $Al_2O_3/SiO_2$ (COK84) 8) | 0.015 | 5 |
| Example 7 | Fluorocarbon base 4) | 100 | Polyisocyanate base resin 5) | 20 | Zirconium silicate (SPZ) 9) | 0.9 | 6 |
| Comparative example 1 | PVB resin 10) | 100 | — | | — | — | — |
| Comparative example 2 | Polyester resin 11) | 100 | — | | Aluminum hydroxide (B325) 3) | 23 | 20 |
| Comparative example 3 | Urethane resin 12) | 100 | — | | — | — | — |

Laser diffraction type particle size distribution measuring equipment (SALD7100, available from Shimadzu Corporation) was used to measure the average grain size.

10 types of electroconductive members in roller form were formed in the manner as mentioned above. Specifically, the electroconductive members include the varying top surface layers 105, and the gap holding member 103 is different in level by about 40 μm from the top surface layer 105.

(Tests)

Image evaluations were made using the image forming apparatus shown in FIGS. 2 and 3 provided with the process cartridge shown in FIG. 4 provided with each of the electroconductive members in roller form as the charging member. A voltage applied to the charging member (or the roller) was set so that DC was equal to −700 V and AC was equal to 2200 Vpp (or a frequency was equal to 2 kHz).

Environment for evaluation was 23° C. and 600% RH. Then, continuous copying took place, halftone image evaluations (or evaluations based on the rank of inconsistencies in image density) were made after making 50,000 copies, and observations were made to observe the surfaces of the charging members. At this time, environment for evaluation was 23° C. and 60% RH. The results of the above evaluations are given in Table 4.

TABLE 4

| | Rank of inconsistencies in image density | Surface of charging member | Evaluation |
|---|---|---|---|
| Example 1 | 4.5 | Slightly contaminated | ○ |
| Example 2 | 5 | Not contaminated | ○ |
| Example 3 | 5 | Not contaminated | ○ |
| Example 4 | 5 | Not contaminated | ○ |
| Example 5 | 4.5 | Slightly contaminated | ○ |
| Example 6 | 5 | Not contaminated | ○ |
| Example 7 | 4.5 | Slightly contaminated | ○ |
| Comparative example 1 | 1 | Contaminated | x |
| Comparative example 2 | 2 | Contaminated | x |
| Comparative example 3 | 2 | Contaminated | x |

As can be seen from Table 4, the charging members of the examples 1 to 7 achieve images with little inconsistency, which satisfy rank 4.5 or higher in the rank of inconsistencies in image density, and moreover, the charging members are little contaminated at their surfaces. As opposed to these, all the charging members of the comparative examples 1 to 3 were contaminated at their surfaces, and inconsistencies in density were observed in halftone images.

According to the electroconductive member in accordance with the embodiment of the present invention, the top surface layer 105 contains one or more oxygen-containing compounds selected from among the composite oxide of silicon and aluminum, the oxygen-containing silicon compound, and the oxygen-containing aluminum compound. Thus, the oxygen-containing compound enables adsorption and decomposition of ozone and $NO_x$ produced by discharge to the image carrier 61 through the application of a high voltage to the electroconductive member, resulting in a reduction in deterioration in the top surface layer 105. This enables maintaining stable electrification performance and thus eliminating the occurrence of image degradation, even if the electroconductive member is used over the long term.

The embodiment of the present invention provides the electroconductive member that maintains stable electrification performance and thus eliminates the occurrence of image degradation, even if the electroconductive member is used as the charging member over the long term. For this reason, the electroconductive member according to the embodiment of the present invention is suitable for use as the charging member for the image forming apparatus or the like.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An electroconductive member comprising a charging member disposed in proximity to an image carrier and configured to charge the image carrier, the charging member comprising:

an electroconductive support;

an electric resistance adjusting layer formed on the electroconductive support; and a top surface layer that coats the surface of the electric resistance adjusting layer and is spaced from the image carrier, wherein the top surface layer comprises zirconium silicate $ZrSiO_4$ and a fluorocarbon base resin.

2. The electroconductive member according to claim 1, wherein the zirconium silicate is in grain form, and the average grain size thereof is equal to or less than 10 μm.

3. The electroconductive member according to claim 1, wherein the top surface layer comprises a non-toner-adherent resin.

4. The electroconductive member according to claim 1, wherein the top surface layer comprises a resin whose main ingredient has a hydroxy group and is crosslinked by a crosslinker.

5. The electroconductive member according to claim 1, wherein the top surface layer is electrically conductive.

6. The electroconductive member according to claim 1, wherein the electric resistance adjusting layer has a cylindrical shape.

7. The electroconductive member according to claim 1, wherein the electric resistance adjusting layer has a volume resistivity of from $10^6$ to $10^9$ Ω cm.

8. The electroconductive member according to claim 1, wherein the electric resistance adjusting layer comprises a thermoplastic resin compound having a high polymeric ion conductive material dispersed therein.

9. A process cartridge comprising the electroconductive member according to claim 1.

10. An image forming apparatus comprising the process cartridge according to claim 9.

11. An image forming apparatus, comprising the electroconductive member according to claim 1.

12. The image forming apparatus according to claim 11, wherein a gap of 5 to 70 μm is provided between the surface of the electroconductive member and the surface of the image carrier.

13. The image forming apparatus according to claim 12, wherein the electroconductive member is provided at both ends with gap holding members to ensure the gap of 5 to 70 μm.

14. The electroconductive member according to claim 1, wherein the top surface layer comprises a fluorocarbon base resin, a silicon base resin, a polyamide base resin, or a polyester resin, or mixtures thereof.

15. The electroconductive member according to claim 1, wherein the top surface layer comprises a two-member coating.

16. The electroconductive member according to claim 15, wherein the two-member coating comprises a compound having a hydroxyl group and an isocyanate base resin.

17. The electroconductive member according to claim 16, wherein the isocyanate base resin is a polyisocyanate resin.

18. The electroconductive member according to claim 17, wherein the polyisocyanate resin is at least one selected from the group consisting of 2,4-tolylene diisocyanate, diphenylmethane-4,4'-diisocyanate, xylylene diisocyanate, isophorone disocyanate, lysinemethylester diisocyanate, methylcyclohexyl diisocyanate, trimethylhexamethylene diisocyanate, hexamethylene diisocyanate, n-pentane-1,4-diisocyanate , a trimer of these, an adduct or bullet of these, a polymer of these having two or more isocyanate groups, and blocked isocyanate.

19. The electroconductive member according to claim 1, wherein the top surface layer further comprises a hardener comprising an amino resin.

* * * * *